J. Robison.
Oar Lock
Nº 67,804. Patented Aug. 13, 1867.
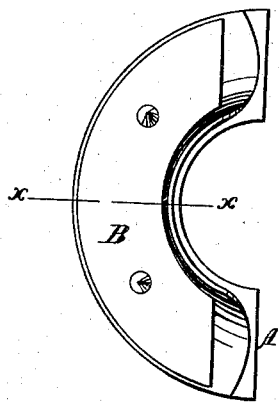
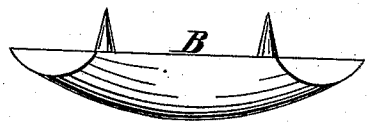
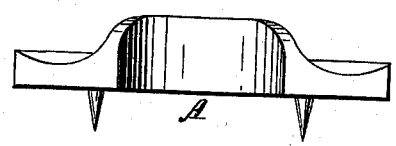
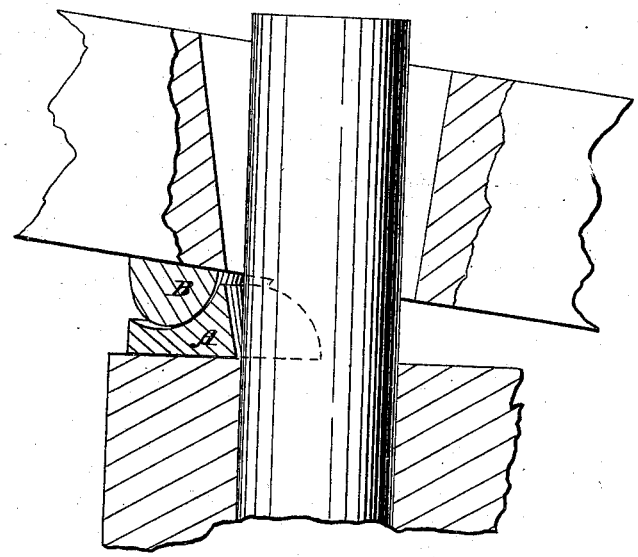
Witnesses,
W. Freurn
Alex F. Roberts
Inventor,
Jackson Robison
Per Munn &
Attorneys.

United States Patent Office.

JACKSON ROBISON, OF CURWINSVILLE, PENNSYLVANIA, ASSIGNOR TO REUBEN HOOVER, OF BOONSBORO, IOWA.

Letters Patent No. 67,804, dated August 13, 1867.

IMPROVED OAR-COLLAR.

The Schedule referred to in these Letters Patent and making part of the same.

TO ALL WHOM IT MAY CONCERN:

Be it known that I, JACKSON ROBISON, of Curwinsville, Clearfield county, Pennsylvania, have invented a new and useful improvement in Oar-Collars; and I do hereby declare that the following is a full, clear, and exact description thereof, which will enable others skilled in the art to make and use the same, reference being had to the accompanying drawings, forming part of this specification.

This invention relates to the navigation of flat-boats, or of rafts of lumber or timber on inland rivers and other waters; and the invention consists in supporting and moving the steering-oar on metallic surfaces, whereby the friction is greatly lessened and the management of the steering or rudder-oar is rendered much less difficult, and consequently the raft is much more easily managed than by the old method.

Figure 1 is a top view of the two pieces of which the collar is composed, arranged as when in use.

Figure 2 is a detached view of the upper or convex piece, and

Figure 3 is a view of the lower or concave piece.

Figure 4 is a cross-section of fig. 1, through the line $x\ x$.

Figure 5 represents the two pieces attached, as when in use, one to the steering-oar and the other to the head-block.

Similar letters of reference indicate corresponding parts.

The steering-oar of a lumber-raft or flat-boat is usually made of a long piece of timber, (which forms the stem,) with a plank firmly attached to its outer end, which forms the blade. The stem has a hole through it, which sets over a pin which is attached to the head-block on the rear end of the raft or flat-boat, the oar being a lever and the pin its fulcrum.

A represents the part of the collar which is attached to the head-block. B is the part which is attached to the oar. Each part has two or more spikes attached to or cast with it, as seen in the drawing, which penetrate the wood of the head-block and of the oar, and which hold the parts in place.

It will be seen by noticing the shape of the wearing surfaces that the oar is allowed both a rocking and a lateral motion, and the collar being a semicircle, the centre of which is the centre of the pin, the oar is supported and moves on the metallic surfaces of the two parts of the collar.

The advantage of this arrangement will be readily understood and appreciated by those who are conversant with rafts and flat-boats.

Having thus described my invention, what I claim as new, and desire to secure by Letters Patent, is—

The oar-collar formed of the parts A and B, when constructed and applied substantially as herein shown and described for the purposes set forth.

The above specification of my invention signed by me this 22d day of April, 1867.

JACKSON ROBISON.

Witnesses:
T. W. FLEMING.
JOHN L. REX.